Oct. 21, 1952   W. C. NEWCOMB ET AL   2,614,468
TIMING MECHANISM FOR MULTIPLE GRID CAMERAS
Filed March 1, 1950   2 SHEETS—SHEET 1
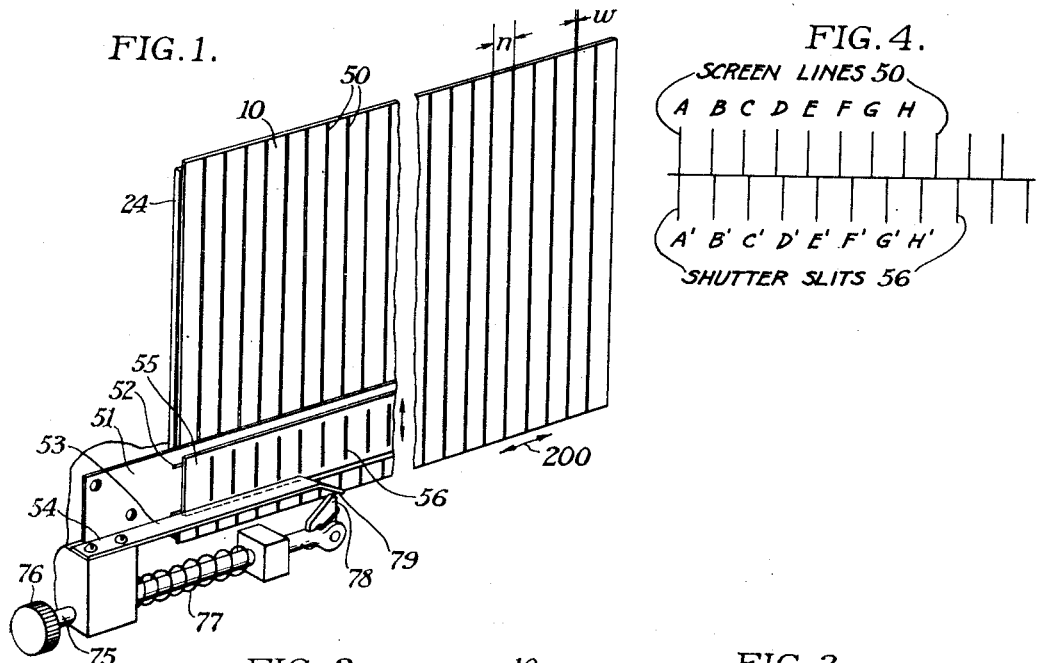
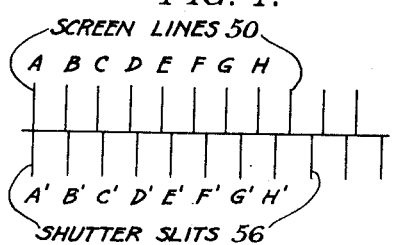
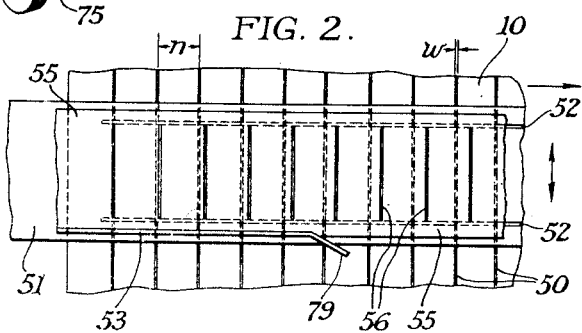
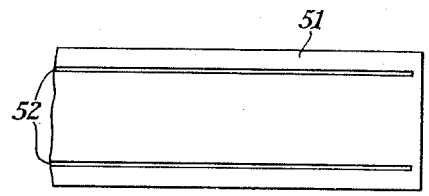
WALTER C. NEWCOMB
CHARLES F. FITTER, JR
INVENTORS Oct. 21, 1952 W. C. NEWCOMB ET AL 2,614,468
TIMING MECHANISM FOR MULTIPLE GRID CAMERAS
Filed March 1, 1950 2 SHEETS—SHEET 2

WALTER C. NEWCOMB
CHARLES F. FITTER, JR
INVENTORS
BY
ATTORNEYS

Patented Oct. 21, 1952

2,614,468

UNITED STATES PATENT OFFICE 2,614,468

TIMING MECHANISM FOR MULTIPLE GRID CAMERAS

Walter C. Newcomb and Charles F. Fitter, Jr., Rochester, N. Y., assignors to Eastman Kodak Company, Rochester, N. Y., a corporation of New Jersey Application March 1, 1950, Serial No. 147,108

8 Claims. (Cl. 95—18)

The present invention relates to high-speed motion-picture cameras operating on the lined screen principle, and particularly to a means for timing the movement of the lined screen in such a camera so that the velocity of the object photographed can be readily determined.

In copending U. S. application Serial No. 114,352, filed September 7, 1949, now Patent No. 2,578,327, issued December 11, 1951, there is disclosed a high-speed motion-picture camera in which a lined screen is moved rapidly across a frame of film in the focal plane of the lens in order to record on the film a plurality of composite pictures, each of which is representative of one subject position of a moving object. By viewing such a composite picture through a lined screen, like the one through which it was exposed, it is possible to selectively view each of the composite pictures individually. By moving the viewing screen or exposed print relative to one another in the same manner in which the exposure was made, the motion of the object can be reproduced. The rate of motion can be varied by altering the speed at which the viewing screen and picture are moved relative to each other.

It is ofttimes desirable, if not necessary, to determine the velocity at which the photographed object was moving. This can be done with the high-speed camera in question if the rate of motion of the lined screen is accurately known and can be translated into terms of the distance covered by the photographed moving object during movement of a lined screen over a given distance at a known rate. Inasmuch as the lined screen in the high-speed camera of the above-noted copending application is spring-driven across the focal plane to make an exposure, and the speed of movement of the screen is generally altered in accordance with the speed of the object being photographed, one cannot rely upon the calculated speed of travel of the screen to figure the velocity of moving objects with much accuracy.

Therefore, the primary object of the present invention is to provide a compact time-recording device which can be included in the high-speed camera of the above-noted application, or a similar type of camera making exposures through lined screens, to make available a photographic record of the time required for the moving screen to travel some given distance, and from which information a direct measure of the velocity of the object photographed can be obtained.

A further object is to provide a time-recording device which makes this record photographically on the margin of the exposed composite picture in multiples of that time required for the screen to move a distance equal to one transparent slit width.

A further object is to provide a timing device of the type referred to which is self-dependent so that it can be built into any existing camera of this type not including a timing device, and which can be selectively used, or left idle, without in any way affecting the normal operation of the camera.

Yet, another object is to provide a timing mechanism of the type described in which the basic time variable is supplied by a vibrating fork, reed, or spring having a known frequency.

And still another object is to provide a timing device of the type described which amplifies the photographic record made on the margin of the composite picture so as to make the record readily legible.

The novel features that we consider characteristic of our invention are set forth with particularity in the appended claims. The invention itself, however, both as to its organization and its methods of operation, together with additional objects and advantages thereof, will best be understood from the following description of specific embodiments when read in connection with the accompanying drawings, in which Fig. 1 is a schematic perspective view showing the essential elements making up a timing mechanism constructed in accordance with a preferred embodiment of the present invention;

Fig. 2 is an enlarged elevational detail view of a portion of Fig. 1 and showing the construction and relative disposition of the lined screen of the camera and the shutter members constituting the primary parts of the present invention;

Fig. 3 is an enlarged detail view of the fixed shutter member of the timing mechanism and conveniently referred to as the "vertical expander";

Fig. 4 is an enlarged diagrammatic view illustrating the relative arrangement of the transparent lines, or slits, in the lined screen of the camera and the second or movable shutter member of the timing mechanism, conveniently referred to as the "horizontal expander," so as to horizontally expand the exposures made on the margin of the light-sensitive surface;

Fig. 5 is an enlarged diagrammatic illustration of what the photographic record, made by the use of the timing mechanism constituting the present invention, might look like under certain operating conditions and with certain dimensions for the parts of the mechanism;

Figure 9:
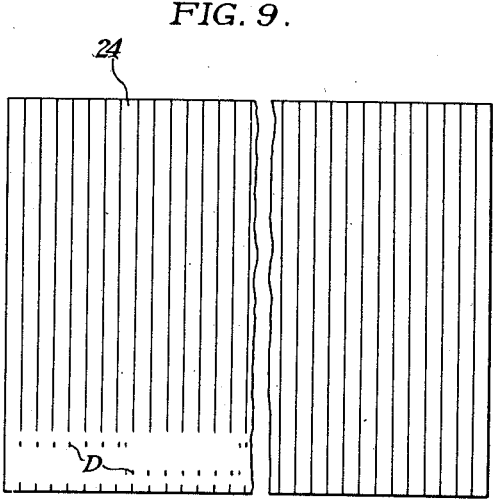
Figure 8:
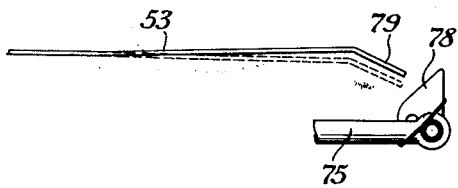

Fig. 8 is an enlarged detail view showing the position of the vibrating grid actuator after setting the grid into vibration; and Fig. 9 diagrammatically illustrates what a picture exposed on a high-speed camera of the lined screen type, and including the present timing device, might look like after processing and looking at the same directly and not through a viewing screen. It is pointed out, however, that because of the nature of the composite picture elements on the print, and the scale of the photographic time record, it is not possible to reproduce this accurately by a line drawing and, hence, this figure shows little more than the location and general appearance of the time record on the print.

Like reference characters refer to corresponding parts throughout the drawing.

In the prior art, and particularly copending U. S. Patent application Serial No. 114,352, filed September 7, 1949, in the names of F. E. Tuttle et al., it is shown how with every translation of the focal plane lined screen or grid a distance equal to the width of one transparent line of the screen a new motion-picture "frame" is recorded. It is true that because of available motion resolution within that distance, the term "frame" in terms of screen line width is ambiguous insofar as simple motion observation is concerned. However, if one wishes to measure the velocity of a photographed object this interpretation is valid, since if we know the distance an object moved over a finite interval of motion of the lined screen along with the time consumed, direct measurement of velocity is possible.

Accordingly, in carrying out our invention we provide a compact time recording device in a lined screen camera to make available a record of the time required for the moving screen to travel some distance. When applied practically, we advantageously provide this in multiples of that time required for the screen to move a distance equal to one transparent line width of the screen. Since it is preferable to have the timing unit completely self-dependent, the basic time interval can be supplied by a mechanical vibrating member, such as a tuning fork, reed, spring, etc. However, since the total motion of the lined screen in the camera which one wishes to record is relatively small, .030" in the case assumed, and the amplitude of any vibrating member near middle "C," or an octave lower, is only a few thousandths of an inch, any record involving a 1:1 combination of these would be so minute as to be useless. Thus, we find it necessary to amplify in a convenient manner each of these motions to such a size as to make legible any record made thereby.

Referring now to the drawing, a preferred embodiment of the present invention will be described. Inasmuch as it is known in the prior art that a screen or grid-type camera of the type to which the combination relates includes means for driving a lined screen across the photographic film, or plate, in order to make a series of exposures, and the above-noted application completely discloses a mechanism mounting the plate in proper relation and driving the screen across the focal plane at high speed, we have not deemed it necessary to show the details of the screen mounting and driving means herein, but have only diagrammatically illustrated the basic elements of such a camera and their operation as is necessary to an understanding of the present invention.

Figure 6:
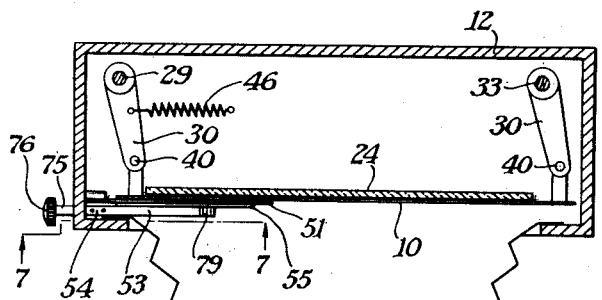
Fig. 6 is a diagrammatic sectional view of a high-speed camera similar to that disclosed in the above-noted copending patent application and showing how the present invention might be readily combined therewith.

For example, as shown diagrammatically in Fig. 6, a screen or grid-type camera of the type in question might include a lens 16 connected to the back 12 of the camera by a bellows 17. In said camera back a frame of light-sensitive material 24, such as a 4" x 5" photographic plate, is located in the focal plane of the lens by any well-known means. Immediately in front of the photographic plate, and parallel thereto, a lined screen 10 is mounted to move across the focal plane in front of the photographic plate. While any suitable means may be provided for mounting the lined screen so that it can be moved across the focal plane at relatively high speed, we have indicated such a means only diagrammatically in Fig. 6, since it constitutes no novel feature of the present invention. In Fig. 6 we have indicated the screen as being connected at opposite ends to driving arms 30 which are, in turn, rotatably mounted at their other ends on vertical shafts 29 and 33 in the camera back. The screen is adapted to be driven across the focal plane in one direction by a spring means indicated in Fig. 6 as a spring 46 connected to one of the driving arms 30, the driving arms being jointed, as indicated at 40, to permit the screen to move in a straight line as that portion of the driving arms 30 connected to the shafts 29 and 33 move in an arc. Means, not shown, will be provided for manually showing the screen 10 against the action of spring 46 to a cocked position in which it will be held by a releasable latch until an exposure is to be made.

Having shown and described the essential features of known lined screen-type cameras with which the present invention cooperates, the invention will now be described with particular reference to Figs. 1–5. In Fig. 1, the lined screen 10 and photographic plate 24 of the camera are shown in the relative positions they assume in the camera. As is well known, the lined screen is generally opaque to the rays of light to which the plate is sensitive and includes a plurality of spaced parallel transparent lines 50 through which the plate is exposed. For motion picture work, the lines 50 are spaced by opaque areas whose width is a multiple of the line width so that a plurality of composite pictures, each indicating a subject position of a moving object, can be exposed in succession on the plate 24 as the screen moves across the same. The screen moves across the focal plane in a direction substantially at right angles to the lines thereof in making an exposure, as indicated by the double arrow 200 in Fig. 1. As shown, it will move to the right under the action of its spring to make the exposure, and will move to the left when being cocked. As is customary, the lines of this screen 10 will be relatively narrow and equal in width, which we will refer to as $w$. They will also be equally spaced by a center line distance which is a multiple of the line width so that the width of the opaque areas between each line will also be equal and be a multiple of $w$ which we will refer to as a width $n$.

The present timing device comprises a narrow opaque strip 51 provided with two horizontal transparent slits 52, which is mounted at one end to a fixed part of the camera back by suitable means, i. e., rivets, as shown, so as to extend in front of one corner of the moving lined screen 10. This strip 51 is, in fact, a shutter member in that it excludes light from one portion of the photographic plate, preferably near the margin thereof, and is conveniently referred to as the "fixed vertical expander."

In front of the "fixed vertical expander" is a vibrating member having a known frequency of vibration, which could be a spring, tuning fork, etc., fixed at one end 54 to a part of the camera back and carrying a thin shutter member 55 provided with a series of vertical transparent slits 56 which constitute another screen, or grid. The slits 56 in shutter member 55 should be the same width $w$ as the lines 50 of screen 10. This latter screen or grid cooperates with the regular moving line screen 10 to form a horizontal expander based on the principle of a vernier. This can be understood by reference to Fig. 4 wherein the lines of screen 10 and slits of shutter member 55 are diagrammatically illustrated by lines in juxtaposition, rather than superposed, as is actually the case; screen lines 50 being designated by the series A, B, C, D, E . . . etc., and the grid slits 56 being designated by the series A', B', C', D' . . . etc. If the distance between A' and B' equals that between A and B, plus one slit width $w$, then motion of the A, B, C . . . etc. series equal to one slit width $w$ moves the superposed slits A and A' out of register, and the slits B and B' into register. If this process is continued, passage of light through A', B', C' . . . etc., as motion of the A, B, C . . . etc. series continues, represents the transition of the slit A through a series of finite steps equal to its own width until it reaches the point formerly occupied by B. Thus, if the transparent lines 50 of screen 10 are .001" wide and spaced on .030" centers, as suggested in the above-noted co-pending patent application, and under which conditions thirty different composite pictures can be made on a single photographic plate without double exposure, we have expanded the scale some thirty times from the original .030" spacing to 1.00". Thus, we have thirty points each representing the passage of a "transparent line width frame." This horizontally expanding grid is best used if placed directly upon the vibrating spring, as shown in Fig. 1. A primary advantage of this system resides in the fact that the vibrating grid does not have to be attached to the moving mechanism of the camera.

As mentioned before, between the vibrating grid 55 and the moving screen 10 is placed the fixed shutter member 51. The horizontal slits 52 in this shutter member are separated by a reasonable distance, say .250", and can be about .005" wide and approximately 1" long for the assumed dimensions of line width and separation of the lines of screen 10. The separation of these horizontal slits 52 must be exactly equal to the length of the slits 56 in the vibrating grid 55, so that when the grid is not vibrating, i. e., in its neutral position, no light is passed by this combination to the movable screen 10.

If the spring is vibrating by say ±.005", the slits of light will be moved into either the upper or lower horizontal slit 52, depending upon the phase of the vibrating grid 55 at the moment. Passage of light through the vertically vibrating slits 56 when displaced into the fixed horizontal slits 52 will be modulated, as described above, directly by the vernier effect between the moving screen 10 of the camera and the grid 55 including the vibrating slits. Thus, all points provided horizontally by the vernier and representing one-half of a cycle time will be displaced into a straight line and separated from those representing the opposite phase by .250".

In Fig. 5 we have shown on an exaggerated scale what the photographic record made by this timing device on the margin of the composite picture might look like with certain assumed data which would, of course, be known for any installation. For instance, let us assume that the combined camera and timing device which made this record had the following known specifications:

| | |
|---|---|
| Width and spacing of lines 50 of screen 10 | .001"/.030" |
| Width and spacing of slits 56 in grid 55 | .001"/.031" |
| Frequency of vibrating grid | 200 c. p. s. |
| Separation of horizontal slits 52 | .250" |
| Amplitude of vibrating grid 55 | ±.010" |
| Points provided by vernier | 30 |

Looking at the record it will be seen that 7½ dots D appear in each half phase of the vibrating grid. Each of these dots is an exposure made through an opening defined by the intersection of horizontal slits 52 of the vertical expander 51 with one of the vertical slits 56 in the vibrating grid 55 when a line 50 of the screen 10 moves across the same when the two slits in question are in an intersecting relationship.

Since each dot represents the passage of one line width on the screen 10, or .001", then 7½ of these dots in a half cycle of the vibrating grid (200 c. p. s.), or 15 of the dots in a full cycle of the vibrating grid, shows that the screen 10 was traveling at the rate of 3" per second, or it would take 1/3000 second for the screen to move the width of one line 50 or .001".

This record would be most conveniently read by looking at the composite print without looking through the viewing grid for then the whole record will appear simultaneously in one corner of the print, as indicated in Fig. 9. In Fig. 9 we have endeavored to show what a composite picture exposed in a lined screen camera equipped with our timing device might look like without viewing it through a screen corresponding to the one through which it was exposed. Obviously, the subject matter of the composite pictures would not be discernible under such conditions because all of the linear picture elements making up thirty different pictures are being observed at once and, for this reason, we have merely indicated these linear picture elements as being blank. If the timing record were observed through the viewing screen with the pictures, however, only one of the dots thereof would be seen at any one instant. Under these conditions, in order to count the number of dots D per phase of the time record, the viewing screen would have to be translated slowly and the number of dots counted as they appeared successively in each horizontal line or phase of the record during shifts in the viewing screen.

Figure 7:
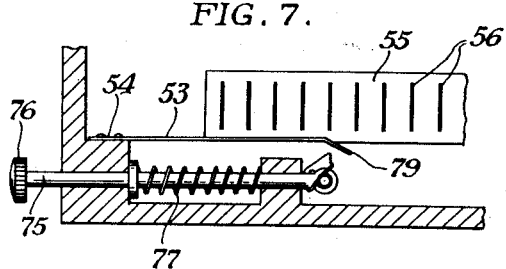
Fig. 7 is an enlarged sectional detail taken substantially on line 7—7 of Fig. 6 and showing means for selectively setting the vibrating grid into vibration.

With this information as to the rate of movement of the screen 10, it is easy to determine the velocity of the object which has been photographed. To do this, one simply has to move the object across the field of the viewer a given distance, say 1", by shifting the viewing screen across the composite picture and noting the actual distance the screen has to be moved to produce this travel of object. Then, by translating this screen movement into multiples of line widths $w$ and multiplying this figure by the time required for the screen to move the width of one line, and again by the reduction factor of the photographic lens, the velocity of the object is obtained. A more direct method would be to have a scale marked in feet, or some other dimensions, in the plane of the object which would be photographed on the plate along with the object so that the scale reduction on the print would take care of the reduction factor of photographic lens. Then, if the viewing screen were made adjustable across the picture with a micrometer adjusting screw that made one revolution each time it moved the screen one line width $w$, it would only be necessary to adjust the screen a sufficient distance to shift the object in the field of view a given distance over the photographed scale and note how many turns of the micrometer screw was required to shift the object the distance in question. Then, knowing the time required to move the taking screen one line width $w$ during the portion of travel in question, the total time would be obtained by multiplying the number of turns of the screw by this known rate. To eliminate the necessity of the operator counting the revolutions of the micrometer screw in question, said screw could be provided with a revolution counter which could be set to zero at any time. Looking at Fig. 5 it will be appreciated that a less complete, but satisfactory, time record could be obtained if only one horizontal line of time exposures D was made representing only a single phase of each cycle of the vibrating grid, rather than during each phase of the cycle as previously shown. This would eliminate the vertical expansion feature provided by the two slits 52 in the vertical expander 51 and would require but one of these slits. Then, as the slits 56 in the vibrating grid 55 moved into alignment with the one slit on the proper phase, the two slits would align or intersect to expose dots on the plate, while when the vibrating grid was in its other phase the two slits in the two members would be out of alignment and no exposures would be made. Under this condition the vertical expander 51 and vibrating grid 55 would act in combination as a single shutter which opens and closes at a known frequency. Under the first condition where the vertical expander has two separated horizontal slits 52, this member, in combination with the vibrating grid, acts as two shutters operating alternately at a known frequency and at separated points relative to the exposure plane. Any suitable means may be provided for selectively setting the grid member 55 into vibration just before an exposure is to be made, and in Figs. 6–8 we have shown one arrangement which would serve this purpose. It includes a rod 75 slideably mounted in the camera back and having a manual control button 76 on one end extending outside one of the side walls of the camera back. When this rod is pushed to the right against the action of spring 77, a pawl 78 pivoted to the other end thereof engages the turned-down end 79 of the spring 53, deflects the spring and then slips off the end thereof to allow it to vibrate, see Fig. 8. The pawl 78 is mounted on the rod so that it can pivot clockwise when it engages the spring 53 upon return of the rod to its normal position under the action of its spring 77, but will be positively connected to the rod when the latter is moved to the right and into engagement with the spring 53, and which engagement would tend to rotate the pawl counterclockwise.

A further modification of the present invention which is obvious in view of the last-mentioned arrangement where a single horizontal series of exposures are made, instead of two, as shown in Fig. 5, is to eliminate the vertical expander 51 altogether, leave the grid 55 stationary and to periodically illuminate the grid 55 from the front with a flashing light which would flash with a known frequency, say 200 c. p. s. In this instance the light and grid 55 would have to be enclosed with a housing of some sort to prevent light therefrom from spreading into the area of the lined screen 10 through which the pictures were being exposed, and to prevent light coming through the lens from passing through the grid 55.

It will be understood that since this timing mechanism is self dependent, its use does not in any way alter or impair the normal operation of the camera to which it is applied. The timing mechanism can be selectively used or left idle, and its presence only results in a small portion of the picture, preferably adjacent one corner thereof as shown, being masked off from the subject being photographed. Should it be desired to further amplify the horizontal expansion of the individual exposures making up the time record, this can be readily done by increasing the spacing between the slits 56 of grid 55 relative to the spacing between the lines 50 of the taking screen 10. For example, if the slits 56 of the grid 55 are spaced .061" apart, instead of .031" apart, then the horizontal expansion of the record would be doubled. This would require lengthening the horizontal slits 52 of the vertical expander 51 to approximately 2" from approximately 1" in order to get 30 points in the record.

While under ordinary conditions exposures made with a camera of this type will be made with visible light, it is conceivable that light-sensitive materials might be used which are sensitive to actinic rays of a wave length which are not generally considered within the visible region of the spectrum, i. e., X-rays, infrared rays, etc. If X-rays are used for making the exposures, then the referred-to transparent slits of the screen 10, vibrating grid 55 and vertical expander 51 might be a material opaque to light rays but capable of passing X-rays, whereas with X-rays the opaque materials referred to would generally be lead. Accordingly, throughout the specification and claims when "light-sensitive" is used to designate a photographic surface it is meant to include any material actinic to rays emanating from the subject to be recorded, "transparent" means capable of passing the actinic rays to which the photographic surface is sensitive, and "opaque" means capable of stopping the rays to which the photographic surface is actinic.

Although we have shown and described certain specific embodiments of our invention, we are fully aware that many modifications thereof are possible. Our invention therefore is not to be limited to the precise details of construction shown and described, but is intended to cover all modifications coming within the scope of the appended claims.

Having thus described our invention, what we claim as new and desire to secure by Letters Patent of the United States is:

1. In a photographic camera for taking a plurality of different composite pictures in side-byside relation on a single frame of light-sensitive material, each picture representing a different position of a moving subject the combination with a lens; means for locating a frame of light-sensitive material in the focal plane of said lens; a lined screen movably mounted in front of said focal plane in parallel relation thereto; said screen including a plurality of parallel spaced transparent lines extending transversely of the screen and each spaced from the other by a linear area opaque to the rays to which said frame is sensitive and which opaque areas are wider than said transparent lines by a multiple of the width of said transparent lines; means for driving said lined screen across said focal plane in a direction substantially at right angles to the lines thereof; of a timing mechanism located adjacent said screen near the margin of said frame and cooperating with the transparent lines of said screen during movement of said screen to photographically record on said frame a series of spaced images representing multiples of that time required for the screen to move a distance equal to one transparent line width during a given interval, and including a shutter 55 located in parallel juxtaposition with said screen and having slits 56 equal in width to the transparent lines of said screen and spaced longitudinally in vernier relation with the lines of said screen.

2. In a photographic camera for taking a plurality of different composite pictures in side-by-side relation on a single frame of light-sensitive material, each picture representing a different position of a moving subject the combination with a lens; means for locating a frame of light-sensitive material in the focal plane of said lens; a lined screen movably mounted in front of said focal plane in parallel relation thereto; said screen including a plurality of parallel spaced transparent lines extending transversely of the screen and each spaced from the other by a linear area opaque to the rays to which said frame is sensitive and which opaque areas are wider than said transparent lines by a multiple of the width of said transparent lines; means for driving said lined screen across said focal plane in a direction substantially at right angles to the lines thereof; of a timing mechanism located adjacent said screen near the margin of said frame and cooperating with the transparent lines of said screen during movement thereof to photographically record on said frame the time required for the screen to travel a known distance, and including a shutter 55 located in parallel juxtaposition with said screen and having slits 56 equal in width to the transparent lines of said screen and spaced longitudinally in vernier relation with the lines of said screen and means for intermittently directing light toward that portion of the frame covered by said slotted shutter with a known frequency so that successive lines of the screen as they align with slots of said shutter will pass light to the frame and expose the same in horizontally spaced portions representative of multiples of that time required for the screen to move distances equal to one transparent line width during a given interval.

3. In a photographic camera for taking a plurality of different composite pictures in side-by-side relation on a single frame of light-sensitive material, each picture representing a different position of a moving subject the combination with a lens; means for locating a frame of light-sensitive material in the focal plane of said lens; a lined screen movably mounted in front of said focal plane in parallel relation thereto; said screen including a plurality of parallel spaced transparent lines of equal width $w$ extending transversely of the screen and each spaced from the other by linear opaque areas of equal width $n$ and which are wider than the transparent lines by a multiple of the width $w$ of the transparent lines; means for driving said lined screen across said focal plane in a direction substantially at right angles to the lines thereof; of a timing mechanism to photographically record on said frame the time required for the screen to travel a known distance including an elongated strip of opaque material extending lengthwise across the lines of said screen adjacent one margin and in front of said frame; transparent lines in said strip equal in width to those in said screen and spaced apart by opaque linear areas having a width equal to $w +$ an integral multiple of $n$, and means for intermittently passing light to said frame through said transparent slits in said strip and screen as the strip moves at a known frequency, whereby the frame will be exposed with a plurality of spaced exposures representative of the number of slit widths the screen moved in a given interval.

4. In a photographic camera for taking a plurality of different composite pictures in side-by-side relation on a single frame of light-sensitive material, each picture representing a different position of a moving subject the combination with a lens; means for locating a frame of light-sensitive material in the focal plane of said lens; a lined screen movably mounted in front of said focal plane in parallel relation thereto; said screen including a plurality of parallel spaced transparent lines of equal width $w$ extending transversely of the screen and each spaced from the other by linear opaque areas of equal width $n$ and which are wider than the transparent lines by a multiple of the width $w$ of the transparent lines; means for driving said lined screen across said focal plane in a direction substantially at right angles to the lines thereof; of a timing mechanism to photographically record on said frame the time required for the screen to travel a known distance and including a horizontal expander comprising an elongated strip of opaque material extending lengthwise in front of said frame and substantially at right angles to the transparent lines of said screen; said strip provided with transparent lines lying substantially parallel to the lines of said screen and being substantially equal in width thereto and spaced from one another by a distance $w$ plus an integral multiple of $n$; means for vibrating said horizontal expander at a known frequency; a vertical expander comprising an elongated strip of opaque material slightly larger than said horizontal expander and disposed in alignment therewith in front of said focal plane; said vertical expander provided with a pair of horizontal transparent slits extending substantially normal to all of the slits in said horizontal expander and spaced apart by a distance slightly greater than the length of said horizontal expander slits but within the range of the vibrational amplitude of said horizontal expander, whereby when said horizontal expander is not vibrating it in combination with the vertical expander will not pass light to the focal plane, and when it is vibrating the slits therein will alternately intersect opposite ones of the slits in the vertical expander in opposite phases of its vibrational movement to pass light to the focal plane.

5. A photographic camera in accordance with claim 4 in which the vertical and horizontal expanders are mounted on a fixed part of the camera in adjacent relationship in front of the movable line screen; and means for selectively setting the horizontal expander into vibration at a time prior to making an exposure to insure said member assuming its normal vibration frequency by the time said exposure is made.

6. In a photographic camera for taking a plurality of different composite pictures in side-by-side relation on a single frame of light-sensitive material, each picture representing a different position of a moving subject the combination with a lens; means for locating a frame of light-sensitive material in the focal plane of said lens; a lined screen movably mounted in front of said focal plane in parallel relation thereto; said screen including a plurality of parallel spaced transparent lines of equal width $w$ extending transversely of the screen and each spaced from the other by linear opaque areas of equal width $n$ and which are wider than the transparent lines by a multiple of the width $w$ of the transparent lines; means for driving said lined screen across said focal plane in a direction substantially at right angles to the lines thereof; of a timing mechanism to photographically record on said frame the time required for the screen to travel a known distance comprising a shutter mechanism disposed in front of said focal plane and screen adjacent the margin of said frame of light-sensitive material, to exclude light from this portion of the focal plane when the shutter is closed; means for opening and closing said shutter at a known frequency; said shutter consisting of two apertured members, one of which has a plurality of transparent lines spaced horizontally in vernier relation with the lines in the screen so that the exposures made on said frame by the combined use thereof and the screen are expanded horizontally as to the exposures made during each open period of the shutter.

7. In a photographic camera for taking a plurality of different composite pictures in side-by-side relation on a single frame of light-sensitive material, each picture representing a different position of a moving subject the combination with a lens; means for locating a frame of light-sensitive material in the focal plane of said lens; a lined screen movably mounted in front of said focal plane in parallel relation thereto; said screen including a plurality of parallel spaced transparent lines of equal width $w$ extending transversely of the screen and each spaced from the other by linear opaque areas of equal width $n$ and which are wider than the transparent lines by a multiple of the width $w$ of the transparent lines; means for driving said lined screen across said focal plane in a direction substantially at right angles to the lines thereof; of a timing mechanism to photographically record on said frame the time required for the screen to travel a known distance comprising a first shutter member extending in front of said focal plane parallel to said screen and having transparent slits substantially parallel to, and equal in width to, the transparent lines of the screen but spaced from one another by a distance equal to $w$ plus an integral multiple of $n$ so as to horizontally expand the exposures made on said frame by lines of said screen moving past slits of said shutter member; a second shutter member aligned with the first shutter member and disposed substantially parallel thereto in front of said focal plane; spaced openings in said second shutter member adapted to cooperate with the slits in said first shutter member when the two members are moved relative to one another to produce exposure areas on said frame of light-sensitive material which are spaced relative to one another in a direction other than horizontally; and means for moving said two shutter members relative to one another at a known frequency during the time said lined screen is moving across said focal plane to obtain exposures on said frame which are spaced in two directions and from which the rate of movement of the lined screen is readily obtained.

8. In a photographic camera for taking a plurality of different composite pictures in side-by-side relation on a single frame of light-sensitive material the combination with a lens; means for locating a frame of light-sensitive material in the focal plane of said lens; a lined screen movably mounted in front of said frame and in parallel relation thereto, said screen including a plurality of spaced parallel transparent lines extending transversely of the screen and each spaced from the other by a linear area opaque to the rays to which said frame is sensitive and which opaque areas are wider than said transparent lines by a multiple of the width of said transparent lines; means for driving said lined screen across said frame in a direction substantially at right angles to the lines thereof; of a time recording mechanism located adjacent said screen near the margin of said frame and including a slotted shutter 55 located in parallel juxtaposition with said screen and having parallel slits 56 equal in width to the transparent lines of said screen and spaced apart by a distance equal to the spacing of the lines of the screen plus the width of one transparent line, said shutter cooperating with the transparent lines of said screen as the latter moves to photographically record on said frame adjacent the margin thereof spaced images each representative of the movement of the screen by an amount equal to the width of one transparent line, means for passing light to that portion of the frame covered by said slotted shutter 55 at a known frequency so that the speed of movement of the screen can be determined by the number of said spaced images made on the frame in succession during the intervals light is allowed to pass to said frame.

WALTER C. NEWCOMB.
CHARLES F. FITTER, Jr.

REFERENCES CITED

The following references are of record in the file of this patent:

UNITED STATES PATENTS

| Number | Name | Date |
|---|---|---|
| 1,260,682 | Kanolt | Mar. 26, 1918 |
| 2,420,339 | Rabinow | May 13, 1947 |
| 2,430,975 | Crowley | Nov. 18, 1947 |